United States Patent [19]

Lee et al.

[11] Patent Number: 4,720,667
[45] Date of Patent: Jan. 19, 1988

[54] ZERO-CURRENT SWITCHING QUASI-RESONANT CONVERTERS OPERATING IN A FULL-WAVE MODE

[76] Inventors: Fred C. Lee, 1405 Westover Dr., Blacksburg; Kwang-Hwa Liu, P.O. Box E-3, Blacksburg, both of Va. 24060

[21] Appl. No.: 877,184

[22] Filed: Jun. 20, 1986

[51] Int. Cl.⁴ .................................................. G05F 1/40
[52] U.S. Cl. .................................... 323/271; 323/235
[58] Field of Search ............... 323/222, 235, 271, 272, 323/282–287, 319

[56] References Cited

U.S. PATENT DOCUMENTS

| | | | |
|---|---|---|---|
| 4,016,461 | 4/1977 | Roland | 323/282 X |
| 4,168,477 | 9/1979 | Burchall | 323/222 |
| 4,323,845 | 4/1982 | Leach | 323/272 X |
| 4,417,197 | 11/1983 | Schwarz | 323/272 |
| 4,546,421 | 10/1985 | Bello et al. | 363/21 |
| 4,585,986 | 4/1986 | Dyer | 323/271 |
| 4,592,763 | 6/1986 | Dietz et al. | 323/271 X |
| 4,620,271 | 10/1986 | Musil | 323/222 X |

FOREIGN PATENT DOCUMENTS 530402 6/1976 U.S.S.R. ............... 323/271

Primary Examiner—Peter S. Wong
Assistant Examiner—Marc S. Hoff
Attorney, Agent, or Firm—Mason, Fenwick & Lawrence

[57] ABSTRACT

A family of quasi-resonant converters for providing regulated power is disclosed as comprising a voltage source, a load and a resonant switch circuit, for periodically connecting the voltage source to the load. The resonant switch circuit includes a switch, and a resonant circuit comprised of a resonant capacitor and a resonant inductor. The switch is actuated to its first state to permit a current flow in a first direction from the voltage source to the load and to block a current flow in a second, opposite direction, and deactuated to a second state to permit a current flow in the second direction from the load to the voltage source and to block the current flow in the first direction, whereby the quasi-resonant converter is operative in a full-wave mode. More specifically, the switch in its first state couples the resonant capacitor and the resonant inductor together to form a resonant switch circuit. The impedances of the resonant capacitor and the resonant inductor are selected to establish a resonating current waveform on the resonant inductor to apply zero-current conditions to the switch at turn on and turn off.

12 Claims, 82 Drawing Figures

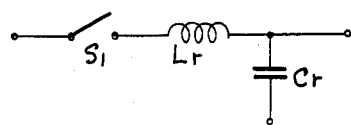
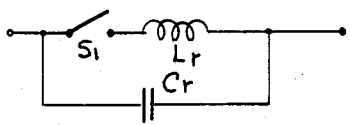
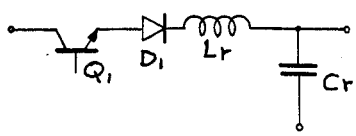
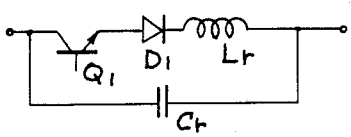
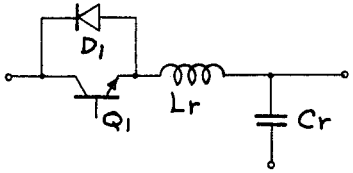
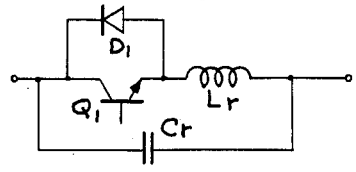
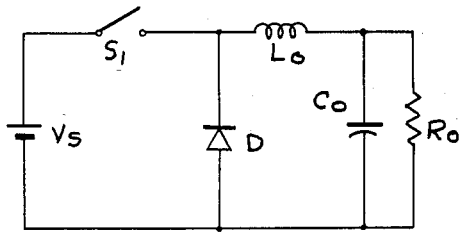
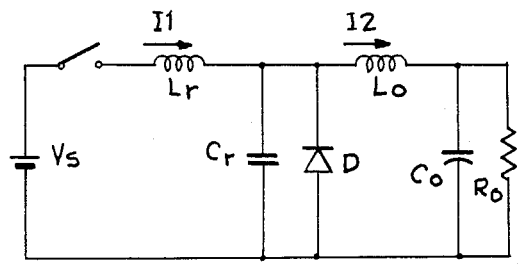
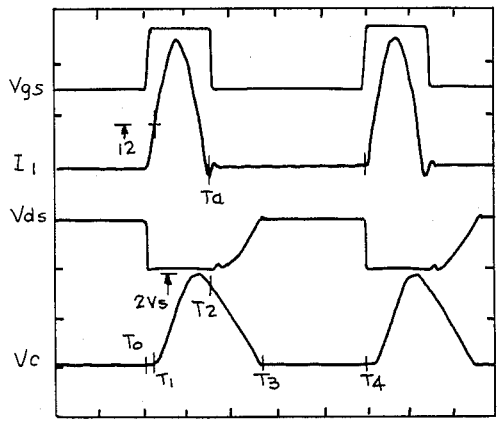
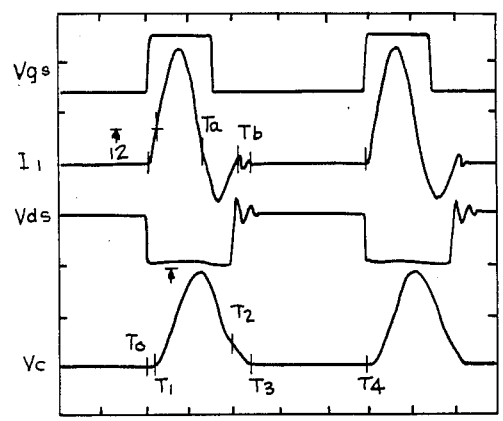
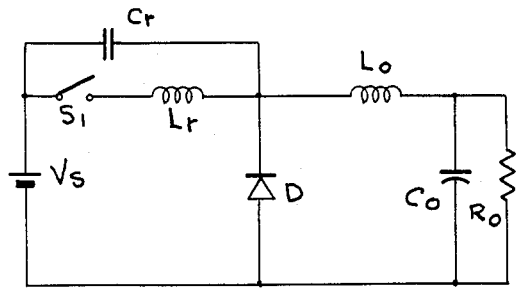

ZERO-CURRENT SWITCHING QUASI-RESONANT CONVERTERS OPERATING IN A FULL-WAVE MODE

BACKGROUND OF THE INVENTION

1. Field of the Invention

This invention relates to switching converters particularly adapted to switch at relatively high frequencies and, in particular, to such converters that achieve switching on and off at zero current level, whereby high efficiency at such high frequencies is achieved.

2. Description of the Prior Art

In conventional pulse width modulation (PWM) switching DC-to-DC converters, a switching device typically in the form of a semiconductor switch turns on and off repetitively at high current levels to achieve output voltage conversion and regulation. Such converters employ magnetic components and capacitors for energy storage/transfer and ripple/filtering. Operating such magnetic components and capacitors at high frequencies reduces their size and cost. In typical PWM converters, the inductive impedance of such magnetic components is coupled in circuit with the semiconductor switches. High frequency switching of such inductive impedances, adversely affects these switches. As the switch is turned on and off rapidly, switching transients involving high levels of current and voltage occur, whereby high switching stresses and losses are imposed upon the semiconductor switch. When such a switch is switched or "forced off", the energy still present in the coupled inductive element imposes high current and high voltage and thus high switching stress and loss on the switch. Furthermore, the pulsating current waveforms resulting from rapid switching, cause severe electromagnetic interaction (EMI) problems as the switching frequency is increased. It is desired to switch such semiconductor switches at relatively high switching frequencies to increase the effectiveness of the voltage control and regulation and, at the same time, minimize the size and cost of the inductive and capacitive elements employed in such converters. However, as the switching frequency increases, the above-noted switching stresses and losses increase and the converter's overall efficiency and reliability decrease.

Snubber circuits are commonly used to alleviate the switching stresses mentioned above. Simple RC or RDC snubber circuits suffer from high power loss at high frequencies. Lossless snubber circuits, on the other hand, increase circuit complexity considerably.

To overcome these problems of switching stress and loss, the technique of "zero current switching" has been described in "Resonant Switching Power Conversion Technique," by E. E. Buchanan and E. J. Miller, IEEE Power Electronics Specialists Conference, 1975 Record, pp. 188–193 and in "Resonant Switching Power Conversions," by E. J. Miller, IEEE Power Electronics Specialists Conferences, 1976 Record, pp. 206–211. Such "zero current switching" technique utilizes an LC resonant tank circuit to force the current through the semiconductor switch to oscillate, whereby the semiconductor switch turns off at zero current level, thereby drastically reducing switching stresses and losses.

To generalize the zero-current switching technique, the concept of resonant switch was described in "Resonant Switches—A Unified Approach to Improve Performance of Switching Converters," by the inventors of this invention, IEEE International Telecommunications Energy Conference, 1984 Proceedings, pp. 344–351. This paper shows the use of "resonant switches" in various conventional pulse-width modulated switching converters to achieve "zero-current-switching". Generally, such resonant switches are a subcircuit consisting of a semiconductor switch $S_1$, a resonance inductor $L_r$, and a resonance capacitor $C_r$. There are two types of resonant switch configurations as shown respectively in FIGS. 1A and B, an L-type and an M-type resonant switch. In both cases, the inductor $L_r$ is connected in series with the switch $S_1$ to slow down the current change rate, and the capacitor $C_r$ is added as an auxiliary energy storage/transfer element. If switch $S_1$ is a device without reverse voltage blocking capability or contains an internal anti-parallel diode, an additional diode $D_1$ is needed and should be connected in series with the switch $S_1$ and the inductor $L_r$, as shown in FIGS. 1C and 1D. The inductor $L_r$ and the capacitor $C_r$ together constitute a series resonant circuit with respect to the switch $S_1$. When the switch $S_1$ conducts, current flows through switch $S_1$ and inductor $L_r$ into the capacitor $C_r$ with a quasi-sinusoidal waveform. As the inductor current drops to zero, the capacitor voltage is charged up with a polarity that reverse biases the switch $S_1$, thus commutating off the switch $S_1$. The resonant switch therefore, provides zero-current-switching properties during both turn on and turn off.

A conventional buck converter is illustrated in FIG. 2A, as comprising a switch $S_1$ for applying upon being rendered conductive a voltage source $V_s$ across a commutation diode D. The commutation diode D is coupled to an output circuit comprised of an output inductor $L_o$ disposed in circuit with an output capacitor $C_o$ connected in parallel with an output resistor $R_o$. This conventional buck converter is modified as shown in FIG. 2B by the addition of the L-type resonant switch, as first shown in FIG. 1A, between voltage source $V_s$ and the commutation diode D. The output inductance $L_o$ is selected to be much larger than inductance $L_r$, thus making the resonant frequency of the resonant circuit comprised of capacitor $C_o$ and the inductor $L_o$ much smaller than that of the resonant circuit comprised of the capacitor of $C_r$ and the resonant inductor $L_r$. It is also assumed that inductor $L_o$ is sufficiently large so that the current $I_2$ through the inductor $L_o$, remains relatively constant throughout a switching cycle.

The operation of the buck resonant converter employing the L-type resonance switch as shown in FIG. 2B, will now be explained with reference to the waveforms as shown in FIGS. 3A to 3D. Before time $T_0$, the semiconductor switch $S_1$ is turned off, whereby the commutation diode D carries the output current $I_o$ with the capacitor voltage $V_c$ clamped at zero. In the first of four distinct switching stages, the semiconductor switch $S_1$ is turned on at time $T_0$, whereby current $I_1$ flowing through the semiconductor switch $S_1$ and the resonant inductor $L_r$ rises linearly as shown in the waveform of FIG. 3B. Between times $T_0$ and $T_1$, the output current $I_2$ shifts gradually from the path through the commutation diode D to the path through the semiconductor switch $S_1$ and the resonant inductor $L_{r\,l}$.

At time $T_1$, the current $I_1$ becomes equal to current $I_2$, whereby the commutation diode D is turned off and, as seen in FIG. 3B, the current $I_1$ *l begins to charge capacitor $C_r$*. As seen in FIG. 3B, the flow of the current of $I_1$ through the resonant inductance $L_r$ and the voltage $V_c$ appearing on resonant capacitor $C_r$ is substantially sinusoidal rising to a peak and falling back to zero at time $T_2$. As shown in FIG. 3D, the voltage $V_C$ across the resonant capacitor rises to a peak of approximately $2V_s$ shortly before time $T_2$, whereby a reverse voltage of $V_c - V_s$ is applied to the semiconductor switch $S_1$ commutating it off naturally at time $T_2$. As shown in FIG. 3B, zero current is flowing in the semiconductor switch $S_1$ at time $T_2$, when it is commutated off. As shown in FIG. 3D, the capacitor $C_r$ discharges in the time interval from time $T_2$ to time $T_3$. The capacitor voltage $V_c$ drops linearly to zero at time $T_3$. In the fourth stage from time $T_3$ to time $T_4$, the output current $I_2$ flows through the commutation diode D and, with the switch $S_1$ open, the resonant capacitor $C_r$ is clamped to zero voltage. At time $T_4$, the switch $S_1$ turns on again, starting the next switching cycle.

FIG. 2C shows a buck resonant converter circuit in which the resonant capacitor $C_r$ is coupled in parallel between the voltage source $V_s$ and the resonant inductor $L_r$ instead of in parallel with the commutation diode, whereby an M-type resonant switch, as shown first in FIG. 1B, is formed. The modified buck resonant converter of FIG. 2C operates in four stages in a manner similar to the operation of the buck resonant converter as described above with respect to FIG. 2B.

The operation of the converter circuits with the L-type and M-type resonant switches as shown in FIGS. 2B and 2C, is in the half-wave mode as shown in FIG. 3B. In other words, the current $I_1$ is permitted to flow through the switch $S_1$ in but a single direction. As will be explained below, these resonant converters as operated in the half-wave mode suffer from a draw back, namely, the DC voltage conversion ratio is sensitive to load variations.

SUMMARY OF THE INVENTION

It is an object of this invention to provide a family of new and improved resonant converters, named quasi-resonant converters, which eliminate switching stresses and losses.

It is a more particular object of this invention to provide a family of new and improved quasi-resonant converters, employing switches that turn on and off at zero current conditions.

It is a still further object of this invention to provide a family of new and improved quasi-resonant converters operating in a full-wave mode, whereby the converter's voltage conversion ratio is made substantially independent of the variations in the load imposed upon the converter.

In accordance with these and other objects of the invention, there is provided a quasi-resonant converter comprising a voltage source, a load and a resonant switch circuit, for periodically connecting the voltage source to the load. The resonant switch circuit includes a switch, and a resonant circuit comprised of a resonant capacitor and a resonant inductor. The switch is actuated to its first state to permit a current flow in a first direction from the voltage source to the load and to block a current flow in a second, opposite direction, and deactuated to a second state to permit a current flow in the second direction from the load to the voltage source and to block the current flow in the first direction, whereby the quasi-resonant converter is operative in a full-wave mode. More specifically, the switch in its first state couples the resonant capacitor and the resonant inductor together to form a resonant circuit. The impedances of the resonant capacitor and the resonant inductor are selected to establish a resonating current waveform on the resonant inductor to apply zero-current conditions to the switch at turn on.

In a further aspect of this invention, the switch is periodically actuated and deactuated at a selected switching frequency $F_s$, and the impedances of the resonant capacitor and the resonant inductor are selected such that the resonant frequency $F_n$ of this resonant circuit is greater than the switching frequency $F_s$ to ensure that the current waveform imposed on the switch by the resonant inductor is at substantially zero current, when the switch is next disposed to its second or off state.

In a still further aspect of this invention, a switch or switch subcircuit as comprised of a transistor and diode coupled with each other, is incorporated within a quasi-resonant converter, to effect converter operation in a full-wave mode. In particular, the transistor and diode are coupled in anti-parallel with each other to form a parallel circuit, which is in turn connected to the resonant inductor and the resonant capacitor. Alternatively, the parallel circuit is coupled in series with the resonant inductor to form a series circuit, which is coupled in parallel with the resonant capacitor.

BRIEF DESCRIPTION OF THE DRAWINGS

A detailed description of a preferred embodiment of this invention is hereafter made with specific reference being made to the drawings in which:

FIGS. 1A-1F show respectively an L-type and an M-type resonant switch subcircuit, and an L-type and an M-type resonant switch subcircuit of half-wave configuration employing a unidirectional switch, both sets of resonant switch subcircuits being known in the prior art, and an L-type and an M-type resonant switch subcircuit of a full-wave configuration employing a composite, bidirectional switch in accordance with the teachings of this invention;

FIGS. 2A, 2B, and 2C are respectively a conventional buck converter, a buck quasi-resonant converter incorporating the L-type resonant subcircuit as shown in FIG. 1A, and a buck quasi-resonant converter incorporating the M-type resonant switch as shown in FIG. 1B, all known in the prior art;

FIGS. 3A, 3B, 3C and 3D are respectively current and voltage waveforms occurring in the course of the operation of the buck quasi-resonant converter as shown in FIG. 2B;

FIGS. 4A, 4B, 4C and 4D are respectively voltage and current waveforms occurring in the course of the operation of the buck quasi-resonant converter in the full-wave mode in accordance with this invention as shown in FIG. 6A;

DETAILED DESCRIPTION OF A PREFERRED EMBODIMENT

Figure 5A:
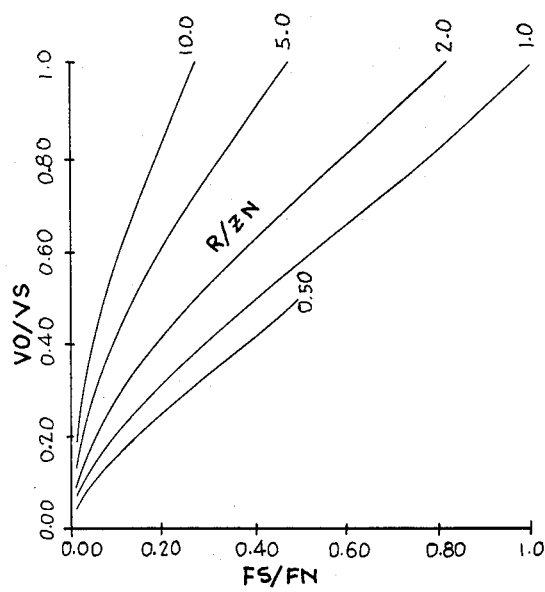
FIGS. 5A and 5B show plots of the voltage conversion ratio, i.e. the ratio of the output voltage $V_o$ to the supply voltage $V_s$ as a function of the ratio of the switching frequency $F_s$ to the resonant frequency $F_n$ of the resonant subcircuit incorporated within a quasi-resonant converter, as operated in a half-wave mode and a full-wave mode, respectively.

Referring now to the drawings and in particular to FIGS. 1E and 1F, there is shown an L-type and an M-type resonant switch subcircuit adapted, as will be explained later, to be incorporated into a family of quasi-resonant converters, whereby such converters operate in a full-wave mode. By way of comparison to the L-type and M-type resonant subcircuits of the prior art as shown respectively in FIGS. 1A and 1B, the generalized switch $S_1$ is replaced by a bidirectional composite switch comprised of a transistor $Q_1$ and a diode $D_1$ connected in anti-parallel relation with the transistor $Q_1$, as shown in both of FIGS. 1E and 1F. In both of these subcircuits, a resonant conductor $L_r$ is connected in series with the bidirectional composite switch to limit di/dt of the composite switch, and a resonant capacitor $C_r$ is connected as an auxiliary energy storage/transfer element. The resonant inductor $L_r$ and the resonant capacitor $C_r$ constitute a resonant LC circuit whose oscillation is initiated by the turn on of the composite switch. In essence, the resonant LC circuit is used to shape the current waveform through the composite switch. The transistor $Q_1$ may illustratively take the form of a well known bipolar transistor or MOSFET. At the instant of turn on, the voltage $V_{ce}$ or $V_{ds}$ across the output of the transistor can be driven into saturation state before the current slowly rises in a quasi-sinusoidal waveform. Because of the resonance between the inductor $L_r$ and the capacitor $C_r$, the current through the composite switch will oscillate, thus, allowing the composite switch to be naturally commutated.

Figure 6A:
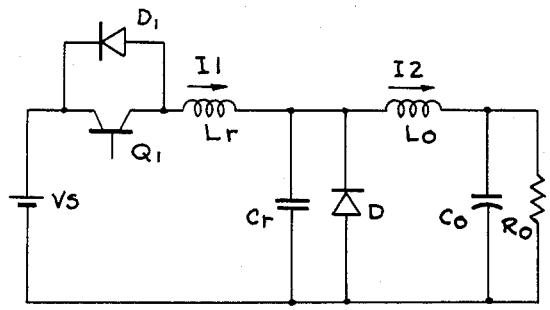
FIGS. 6A and 6B are respectively a buck quasi-resonant converter incorporating the L-type resonant subcircuit as shown in FIG. 1E and operating in a full-wave mode, and a buck quasi-resonant converter incorporating the M-type resonant switch as shown in FIG. 1F and operating in a full-wave mode, both in accordance with the teachings of this invention.
Figure 6B:
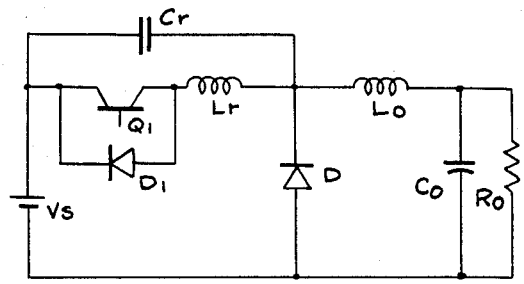
Figure 7A:
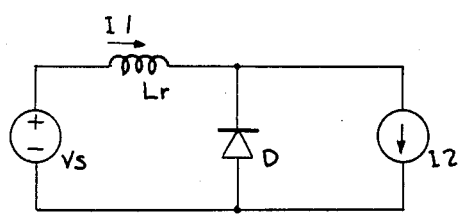
FIGS. 7A, 7B, 7C and 7D show respectively the various switching stages of the buck quasi-resonant converter as shown in FIG. 6A.
Figure 7C:
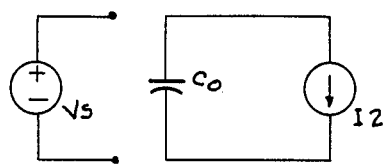
Figure 7B:
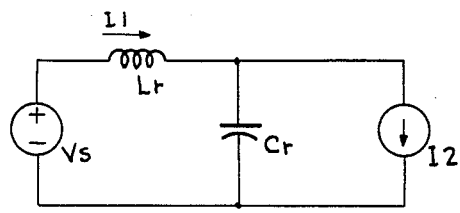
Figure 7D:
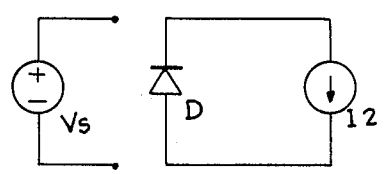

In FIGS. 6A and 6B, there is shown a converter similar to that shown in FIGS. 2A, 2B and 2C, but modified in accordance with the teachings of this invention to include one of the bidirectional resonant switch subcircuits of FIGS. 1E and 1F to provide a buck quasi-resonant converter operative in a full-wave mode. In the case of a buck quasi-resonant converter, a voltage source $V_s$ is selectively coupled by the bidirectional resonant switch subcircuit of either FIG. 1E or 1F across a commutation diode D. In turn, the commutation diode D is coupled to an output circuit comprised of an output inductor $L_o$ connected in series with an output capacitor $C_o$, which is in turn connected in parallel with an output resistor $R_o$. As understood in the prior art, the output inductor $L_o$ and the output capacitor $C_o$ function as a filter circuit. If the impedance of the output inductor $L_o$ is made much greater than that of the resonant inductor $L_r$, the output inductor $L_o$, the output capacitor $C_o$ and the load resistor $R_o$ are treated as a constant current sink to produce a current $I_2$, as indicated in the equivalent circuits of FIGS. 7A, 7B, 7C and 7D. The buck quasi-resonant converter as shown in each of FIGS. 6A and 6B have the following characteristics:

Characteristic impedance $Z_n = \sqrt{L_r/C_r}$

Resonant angular frequency $\omega = 1/\sqrt{L_r/C_r}$

Resonant frequency $F_n = \omega/2\pi$

The buck quasi-resonant converter of FIG. 6A operates in a full-wave mode, exhibiting the voltage and current waveforms as shown in FIGS. 4A, 4B, 4C and 4D. As shown in FIGS. 4, the voltage and current waveforms occur in time such that the buck quasi-resonant converter of FIG. 6A is considered to operate in the four following switching stages: (1) a first, linear stage from times $T_0$ to $T_1$; (2) a second, resonant stage from times $T_1$ to $T_2$; (3) a third, recovering stage from times $T_2$ to $T_3$; and (4) a fourth, free-wheeling stage from times $T_3$ to $T_4$. The equivalent circuit of each of these four stages is respectively shown in FIGS. 7A, 7B, 7C and 7D.

Before time $T_0$, the output current $I_2$ is kept constant by the relatively large value of the output-filter inductor $L_o$, the transistor $Q_1$ is off, capacitor voltage $V_c$ on the resonant capacitor $C_r$ is zero, and the output current $I_2$ is free-wheeling through diode D. At time $T_0$ of the first or linear stage, the transistor $Q_1$ turns on, whereby the input current $I_1$ flows into the resonant inductor $L_r$ and rises linearly between times $T_0$ and $T_1$, as shown in FIG. 4B as reflected in the equivalent circuit of FIG. 7A, the current $I_1$ flows in a completed circuit through the resonant inductor $L_r$ and the commutation diode D.

In the second or resonant stage, the diode D stops conducting at time $T_1$ when the input current $I_1$ reaches the level of the output current $I_2$. The input current $I_1$ then starts to charge up the resonant capacitor $C_r$. Due to the resonant circuit formed by the resonant inductor $L_r$ and the resonant capacitor $C_r$ as shown in its equivalent circuit of FIG. 7B, the input current $I_1$ oscillates in a quasi-sinusoidal fashion and reverses its direction after a certain time interval, as shown in FIG. 4B. The negative current flows back to the capacitor $C_r$ through the anti-parallel diode $D_1$. The transistor $Q_1$ remains conductive as long as the input current $I_1$ is positive. When the input current $I_1$ goes negative, the transistor $Q_1$ turns off at zero current, and the anti-parallel diode $D_1$ is rendered forward biased to conduct the negative going input current $I_1$. As the transistor $Q_1$ is completing a resonant cycle, a packet of input energy is transferred to and stored in the resonant capacitor $C_r$.

After the transistor $Q_1$ is off at time $T_2$, the third or recovering stage starts, in which capacitor $C_r$ keeps discharging its energy into the current load until time $T_3$, when its charge is depleted, as shown in FIG. 4D.

At time $T_3$, the fourth or free-wheeling stage begins, wherein the commutating diode D conducts and carries the free-wheeling output current $I_2$ through the output-filter inductance $L_o$. At time $T_4$, the transistor $Q_1$ turns on again and starts the next cycle.

Typical waveforms of the forward buck quasi-resonant converter circuit are illustrated in FIGS. 4A, 4B and 4C. The zero current switching property is evidenced by examining the current and voltage waveforms, i.e. the input current $I_1$ is zero when either the transistor $Q_1$ or the anti-parallel diode $D_1$ turns off and on. Also, energy is transferred to the output in a packet, whereby voltage regulation can be achieved by varying the turn-on repetition rate, i.e. the switching frequency $F_s$ of the transistor $Q_1$.

Considering now in detail full-wave mode as illustrated in FIG. 4B, the input current $I_1$ goes in both a negative and a positive direction, whereby it is said that the buck quasi-resonant converter, as shown in FIG. 6A, operates in a full-wave mode. By contrast, a buck converter with a resonant switch of either FIG. 1C or 1B, is said to operate in a half-wave mode. As shown in FIG. 3B, the input current $I_1$ of this prior art buck converter does not go negative and there is no corresponding transfer of energy to the voltage source $V_s$. More specifically, if a half-wave resonant switch subcircuit as shown in FIGS. 1C or 1D is used, its switch will be naturally commutated at time $T_a$, when the resonating input current $I_1$ returns to zero, as shown in FIG. 3B. On the other hand, if a full-wave switch resonant subcircuit as shown in either of FIGS. 1E or 1F is used, the input current $I_1$ will continue to oscillate going through zero at time $T_a$ into a negative voltage region as shown in FIG. 4B, and feed energy back to the voltage source $V_s$ through the anti-parallel diode $D_1$, as shown in FIG. 6A. The current through the anti-parallel diode $D_1$ returns to zero at time $T_b$ as shown in FIG. 4B.

Figure 5B:
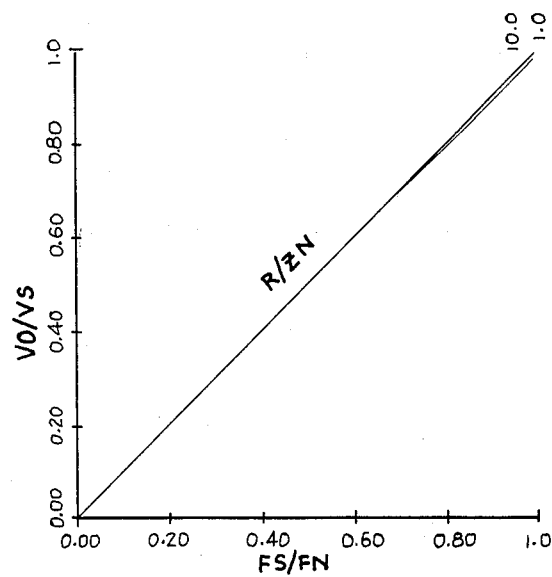

Voltage conversion ratios for the buck quasi-resonance converter are plotted in FIGS. 5A and 5B for that converter as shown in either of FIGS. 2B or 2C as operated in the half-wave mode and for that converter as shown in either of FIGS. 6A or 6B as operated in its full-wave mode, respectively.

FIG. 5A shows the output-to-input voltage conversion ratio $V_o/V_s$ as a function of the normalized frequency, i.e. the ratio of the switching frequency $F_s$ to the resonant frequency $F_n$ as defined above. As $R_o/Z_n$, i.e. the ratio of the output resistance to the characteristic impedance, decreases from 10 to 0.5 corresponding to an increase of load, a distinct graph for each of such loads is shown as a function of the normalized frequency. Thus, the buck resonant converter of FIGS. 2B or 2C exhibits significantly different voltage conversion ratios as its load changes. By contrast, the buck quasi-resonant converter of FIGS. 6A or 6B as operating in a full-wave mode, exhibits a set of voltage conversion ratios as seen in 5B. As shown, the load on the full-wave mode, quasi-resonant converter may vary significantly, i.e. the ratio $R_o/Z_n$ may vary from 10 to 1, without significantly changing the voltage conversion ratio. FIG. 5B suggests that the voltage regulation of the full-wave mode quasi-resonant converter of FIG. 6A or 6B, may be made dependent only upon the normalized switching frequency $F_s/F_n$. Noting that the resonant frequency $F_n$ remains substantially constant once the elements of the circuit are set, the desired conversion ratio may be controlled in this embodiment by determining the switching frequency $F_s$.

Figure 8A:
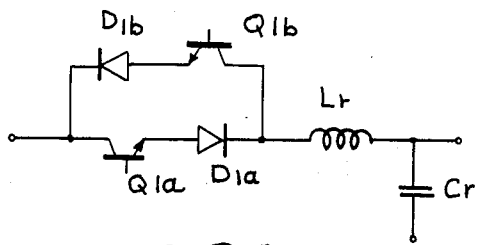
FIGS. 8A and 8B show respectively an L-type and an M-type resonant switch employing plural unidirectional switches and capable of conducting a selected number of half-cycles during their on time.
Figure 8B:
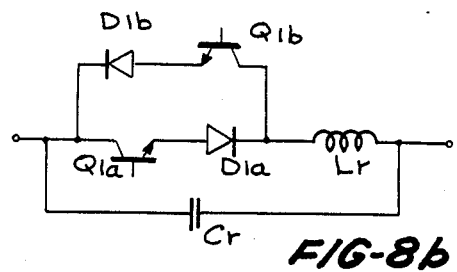
Figure 9A:
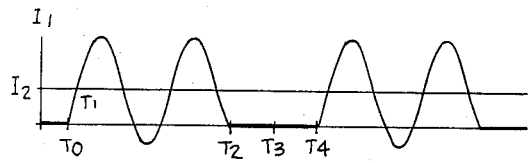
FIGS. 9A, 9B, 9C, 9D and 9E show respectively the current and voltage waveforms of, as well as the DC voltage conversion ratio for, a buck quasi-resonant converter employing respectively the L-type and the M-type switches as shown in FIGS. 8A and 8B.
Figure 9B:
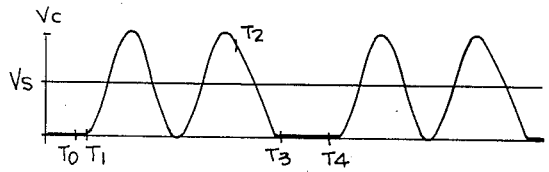
Figure 9C:
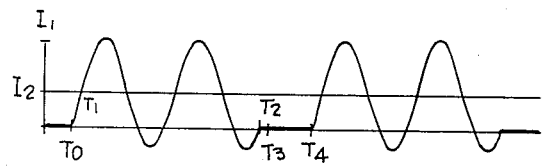
Figure 9D:
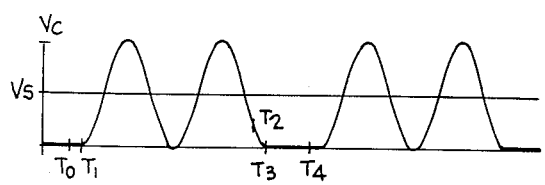
Figure 9E:
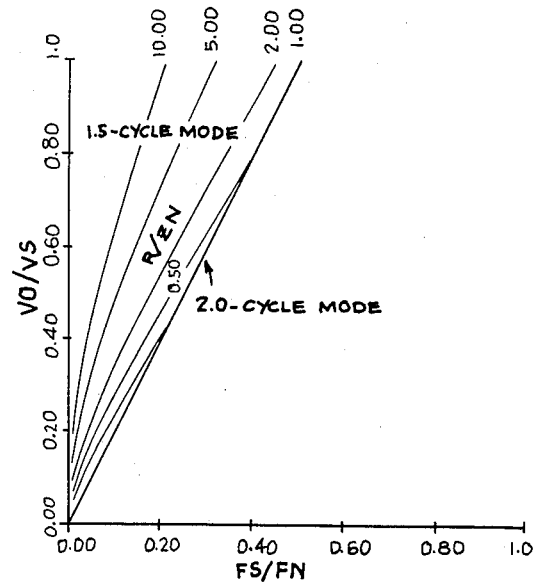

The resonant frequency $F_n$ is dependent as defined above upon the values of the leakage inductance $L_r$ and the resonance capacitor $C_r$. The resonance frequency $F_n$ determines the period and frequency of the oscillations of the input current $I_i$, as shown in FIG. 4B. As shown in FIG. 4D, the period and frequency of the oscillation of the resonant capacitor voltage $V_c$ is dependent upon the values of the resonant capacitor $C_r$ and the resonant inductor $L_r$. When the current flows from the resonant inductor $L_r$ to the resonant capacitor $C_r$, the resonant capacitor $C_r$ is charged with an oscillating voltage as shown in FIG. 4D. As may be observed in FIGS. 4, the switching frequency $F_s$ of the transistor $Q_1$ must be set lower than the frequencies of the waveforms of FIGS. 4B and 4D, to permit the input current $I_1$ to return to zero so that the transistor turns on and off under zero-current conditions. A further embodiment of an M-type and an L-type full-wave resonant switch is shown in FIGS. 8A and 8B, respectively. These switch subcircuits are capable of conducting multiple cycles of the input current $I_1$ during its on time. As seen in FIGS. 8A and 8B, the subcircuits comprise first and second transistors $Q_{1a}$ and $Q_{1b}$, each coupled respectively in series with its anti-parallel diode $D_{1a}$ and $D_{1b}$. FIGS. 9A and 9B show current and voltage waveforms of a buck quasi-resonant converter similar to that shown in FIGS. 6A or 6B incorporating one of the subcircuits as shown in FIGS. 8A or 8B, as operating in a 1.5-cycle mode. Similarly, FIGS. 9C and 9D show the waveforms of a similarly modified buck quasi-resonant converter operating in a 2.0-cycle mode. Gating signals are applied to the bases of the transistors $Q_{1a}$ and $Q_{1b}$ so that the transistor $Q_{1a}$ is rendered conductive when the input current $I_1$ is positive and to the transistor $Q_{1b}$ when the input current $I_1$ is negative, as seen in FIGS. 9A and 9B. The voltage conversion ratio modes have been plotted for the multicycle operation as described above and as shown in FIG. 9E, indicating that the voltage conversion ratio of a 2.0-cycle mode are twice that of the single cycle full-wave mode.

Figure 10:
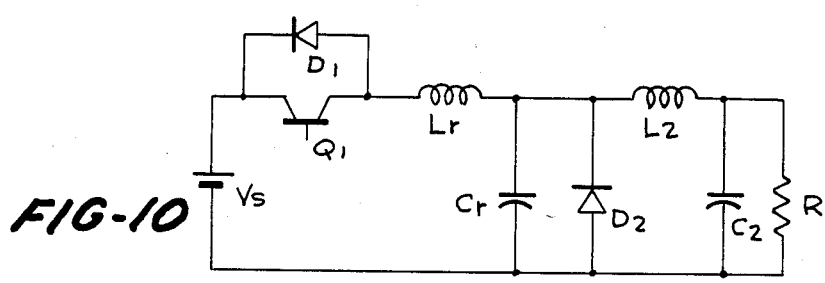
FIG. 10 is a detailed circuit diagram of a buck quasi-resonant converter as operative in the full-wave mode of operation in accordance with the teachings of this invention.
Figure 11A:
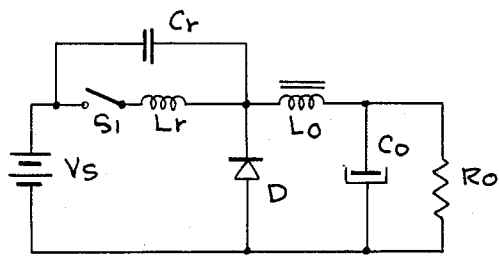
FIGS. 11A to 11F show a family of buck quasi-resonant converters including one of the resonant switch subcircuits as shown in FIGS. 1E and 1F to effect full-wave operation in accordance with the teachings of this invention.
Figure 11D:
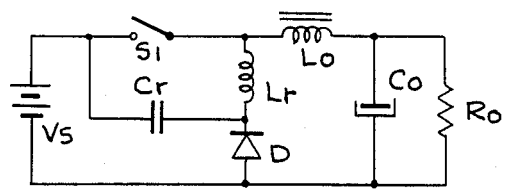
Figure 11B:
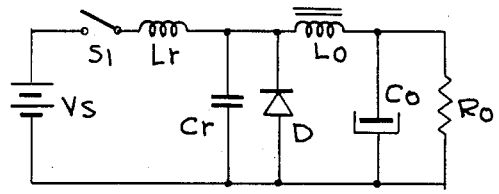
Figure 11E:
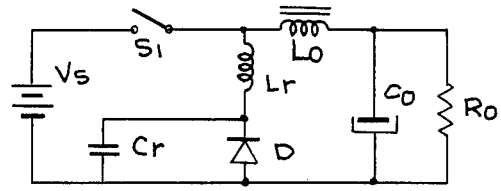
Figure 11C:
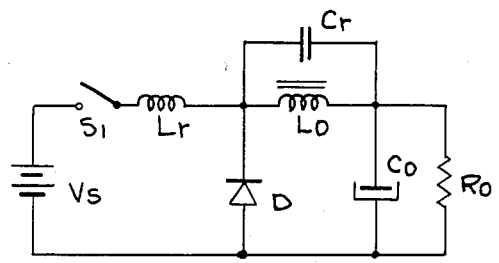
Figure 11F:
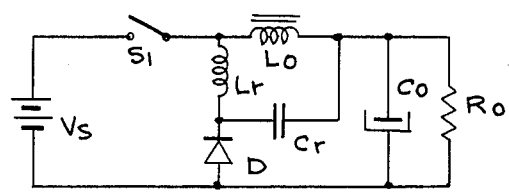
Figure 12A:
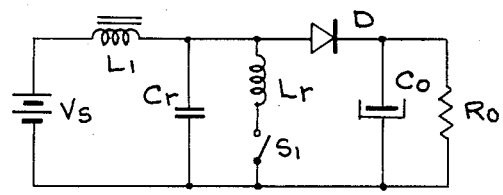
FIGS. 12A to 12F show a family of boost quasi-resonant converters incorporating one of the resonant switch subcircuits as shown in FIGS. 1B and 1F to effect a full-wave mode of operation in accordance with the teachings of this invention.
Figure 12D:
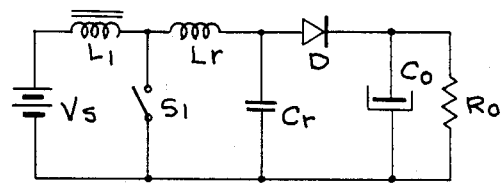
Figure 12B:
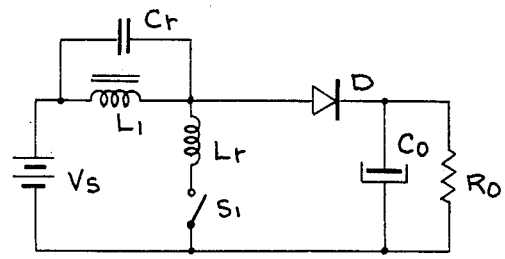
Figure 12E:
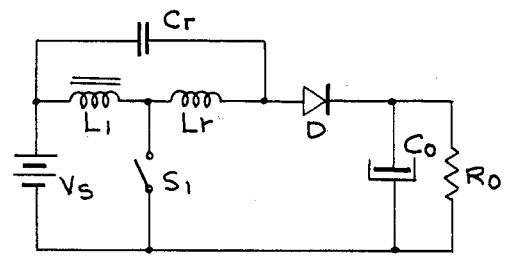
Figure 12C:
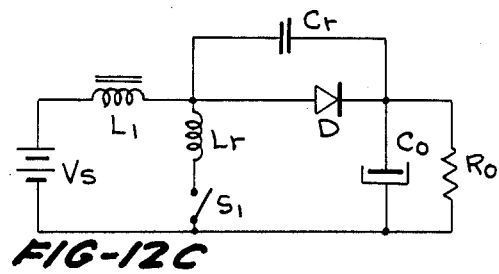
Figure 12F:
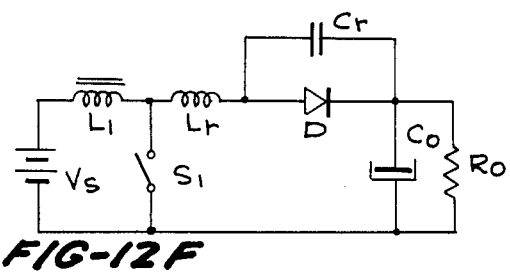
Figure 13A:
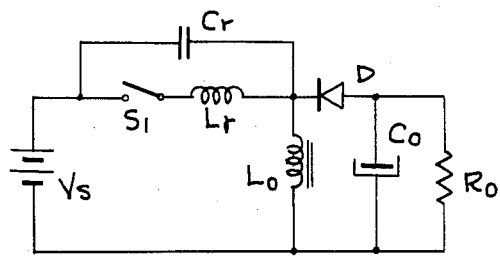
FIGS. 13A to 13F show a family of buck-boost quasi-resonant converters including one of the resonant switch subcircuits as shown in FIGS. 1E and 1F to effect a full-wave mode of operation in accordance with the teachings of this invention.
Figure 13B:
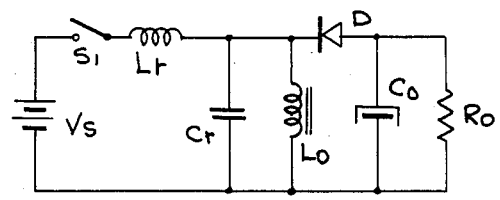
Figure 13C:
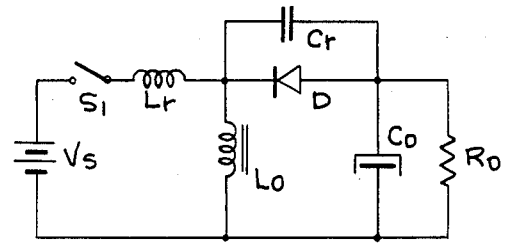
Figure 14A:
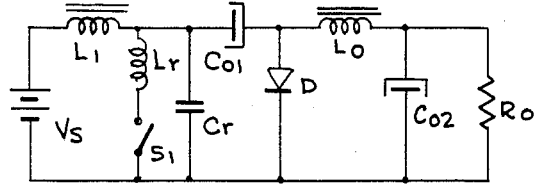
FIGS. 14A to 14P show a family of boost-buck quasi-resonant converters including one of the resonant switch subcircuits as shown in FIGS. 1E and 1F to effect a full-wave mode of operation in accordance with the teachings of this invention.
Figure 14B:
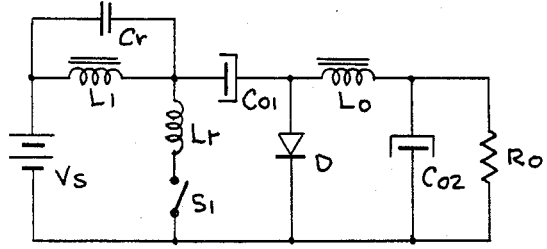
Figure 14C:
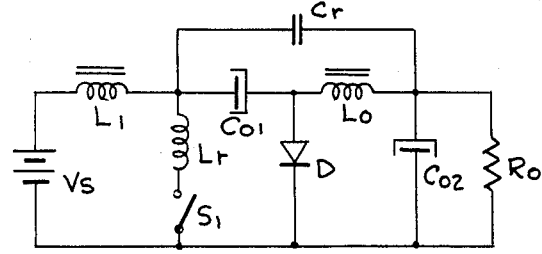
Figure 13D:
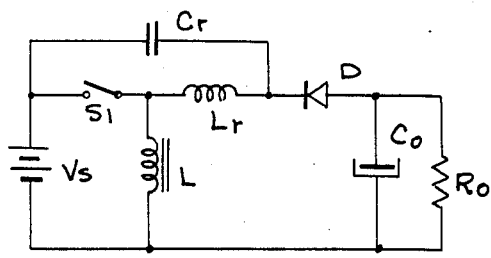
Figure 13E:
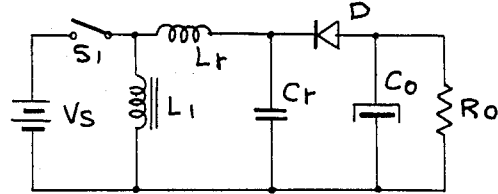
Figure 13F:
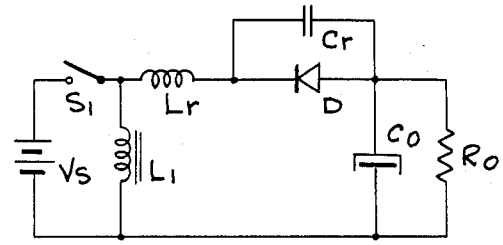
Figure 14D:
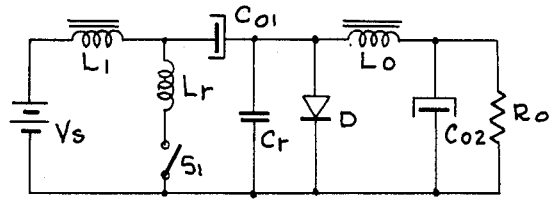
Figure 14E:
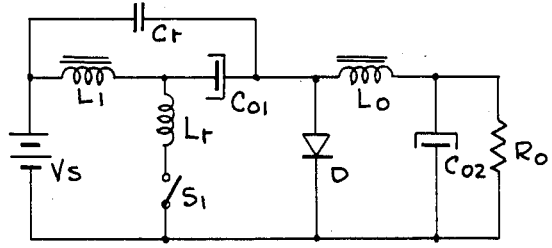
Figure 14F:
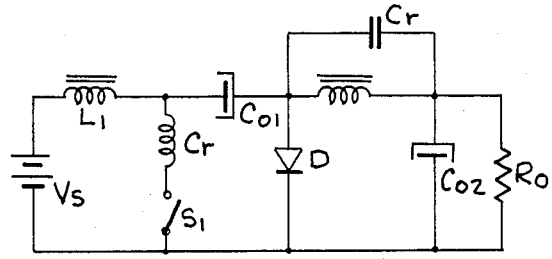
Figure 14G:
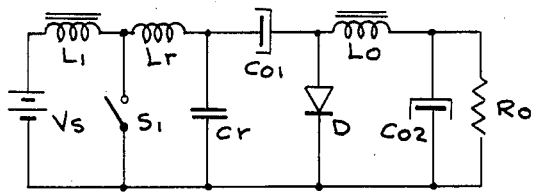
Figure 14H:
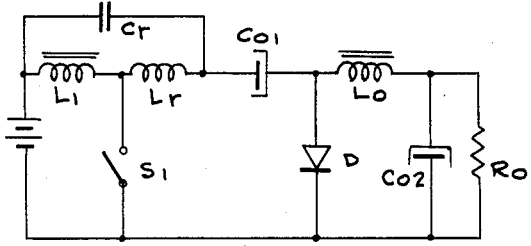
Figure 14I:
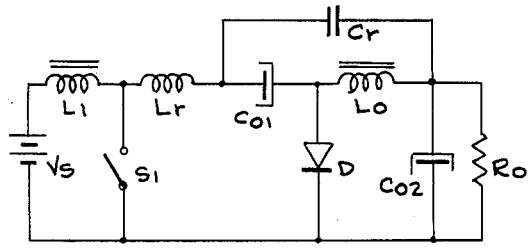
Figure 14J:
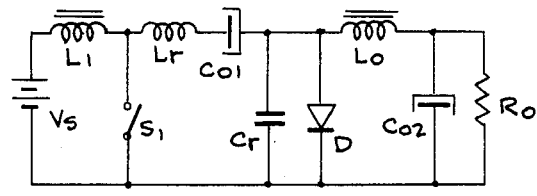
Figure 14K:
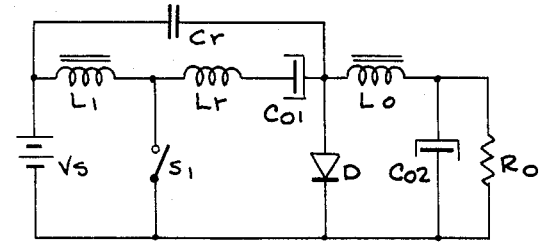
Figure 14L:
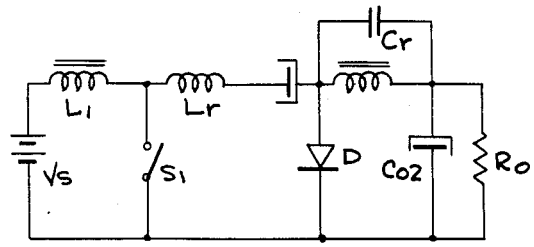
Figure 14M:
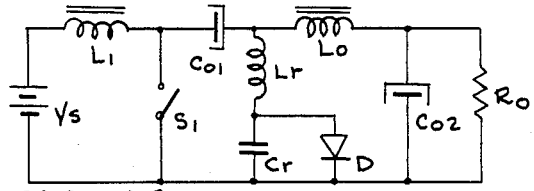
Figure 14N:
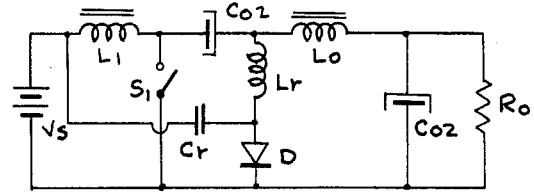
Figure 14O:
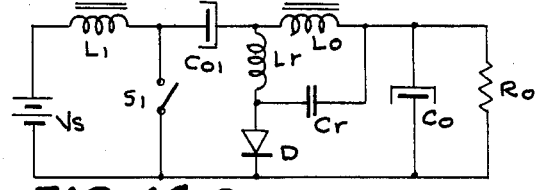
Figure 14P:
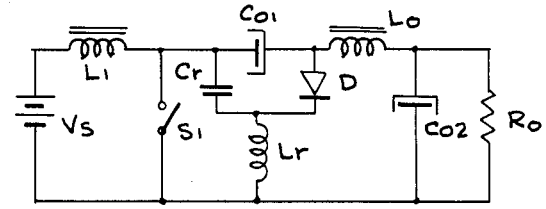

A detailed embodiment of a buck quasi-resonant converter is shown in FIG. 10, wherein the impedances of the circuit elements and the circuit elements are selected as follows:

$L_r = 6.4\ \mu H$
$C_1 = 0.016\ \mu F$
$L_2 = 50\ \mu H$
$F_n = 500\ kH_z$
$Z_n = 2\ ohm$
$Q_1 = 1RF531$
$D_1 = IR\ 31DQ6$
$D_2 = IR\ 31DQ6$
$V_s = 20\ V$ The circuit of FIG. 10 is capable of operating at 500 kHz to deliver 30 watts in its full-wave mode of operation. If the resonant inductor $L_r$ is replaced by a short circuit, the lead inductance and the resonant capacitor $C_r$ will form a resonant tank circuit such that the resultant buck quasi-resonant converter can operate at 5.2 MHz.

A limited number of embodiments of a zero-current quasi-resonant converter are described in detail above. However, it is understood that the principals of this invention may be applied to a large number of different types of converters, as will now be illustrated. In FIGS. 11, there is shown a family of buck quasi-resonant converters modified by including one of the subcircuits as shown in FIGS. 1E or 1F, wherein similar elements are similarly designated. FIG. 12 similarly show a family of boost quasi-resonant converters similar to prior art boost converters, but modified to include one of the resonant subcircuits as shown in FIGS. 1E or 1F, with similar elements bearing notations similar to that previously used. FIG. 13 illustrates a further family of buck-boost quasi-resonant converters, similar to the buck-boost converters of the prior art, but modified to include one of the resonant subcircuits as shown in FIGS. 1E or 1F, with similar elements bearing similar notations as previously used. FIG. 14 show a still further family of boost-buck quasi-resonant converters resembling boost-buck converters of the prior art, yet modified to include a resonant subcircuit as shown in FIGS. 1E or 1F, with similar elements bearing notations similar to that previously used.

Figure 15A:
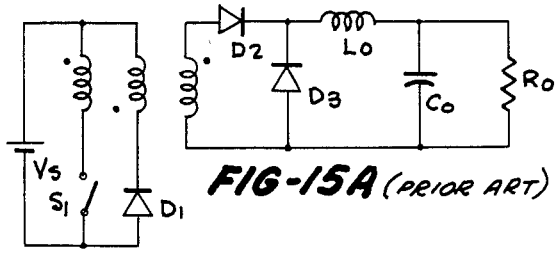
FIG. 15A shows a forward converter in accordance with the prior art.
Figure 15B:
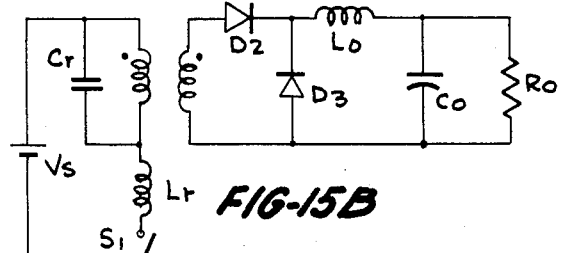
FIGS. 15B and 15C show a family of forward quasi-resonant converters including one of the resonant switch subcircuits as shown in FIGS. 1E and 1F to effect a full-wave mode of operation in accordance with the teachings of this invention.
Figure 15C:
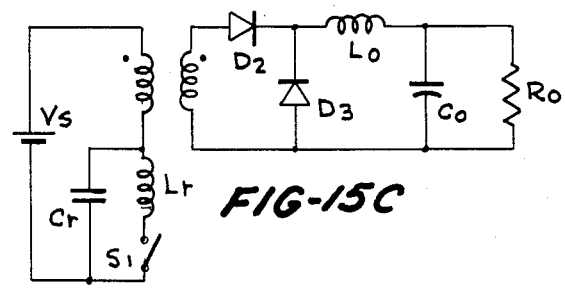
Figure 16A:
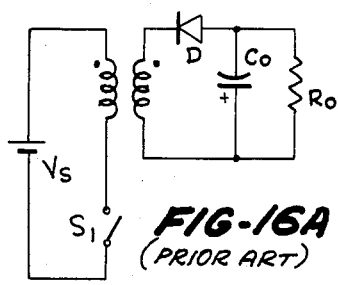
FIG. 16A shows a flyback converter in accordance with the prior art.
Figure 16B:
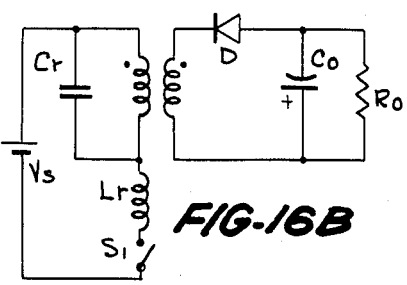
FIGS. 16B and 16C show a family of flyback quasi-converters including one of the resonant switch subcircuits as shown in FIGS. 1E and 1F to effect a full-wave mode of operation in accordance with the teachings of this invention.
Figure 16C:
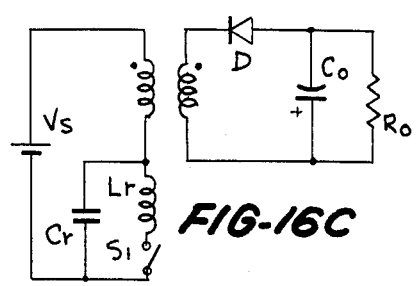
Figure 17A:
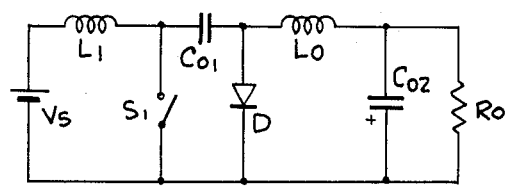
FIG. 17A shows a CUK converter in accordance with the prior art.
Figure 18A:
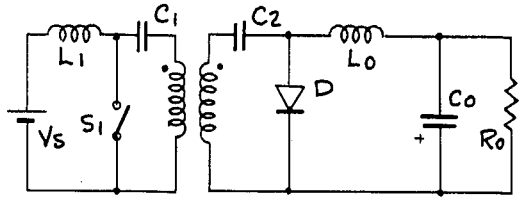
FIG. 18A shows a CUK converter including a transformer in accordance with the prior art.
Figure 17B:
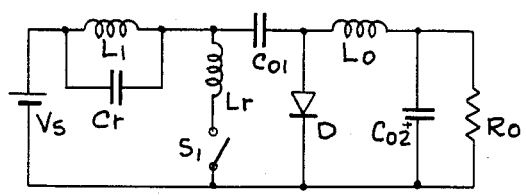
FIGS. 17B and 17C show a family of CUK quasi-resonant converters including one of the resonant switch subcircuits as shown in FIGS. 1E and 1F to effect a full-wave mode of operation in accordance with the teachings of invention.
Figure 18B:
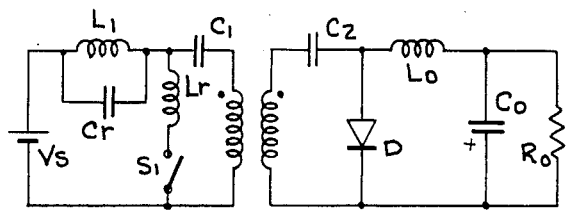
FIGS. 18B and 18C show a family of CUK quasi-resonant converters including a transformer and one of the resonant switch subcircuits as shown in FIGS. 1E and 1F to effect a full-wave mode of operation in accordance with the teachings of this invention.
Figure 17C:
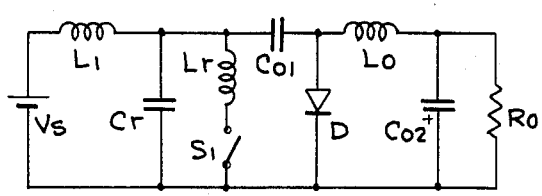
Figure 18C:
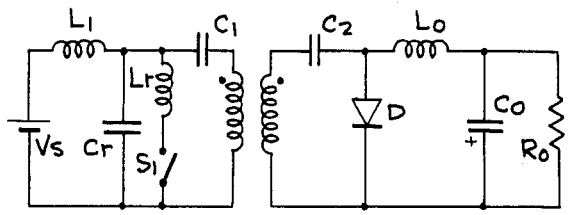
Figure 19A:
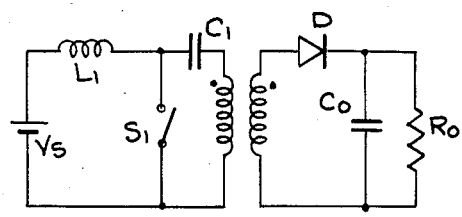
FIG. 19A shows a SEPIC converter in accordance with the prior art.
Figure 19C:
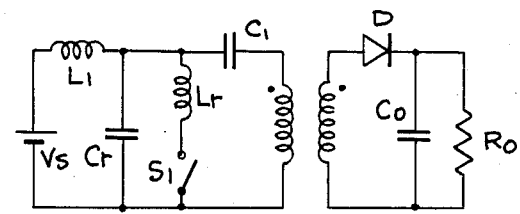
FIGS. 19B and 19C show a family of SEPIC quasi-resonant converters including one of the resonant switch subcircuits as shown in FIGS. 1E and 1F to effect a fullwave mode of operation in accordance with the teachings of this invention.
Figure 19B:
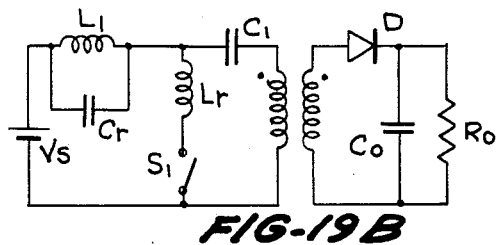

In FIG. 15A, there is shown a conventional forward converter, whereas FIGS. 15B and 15C show a family of forward quasi-resonant converters similar to the prior art converter as shown in FIG. 15A, but modified to include a resonant switch subcircuit as shown in FIG. 1E or 1F with similar elements bearing notations similar to that previously used. FIG. 16A shows a conventional flyback converter in accordance with the prior art. FIGS. 16B and 16C show a family of flyback quasi-resonant converters similar to that shown in FIG. 16A, but modified to include a resonant switch subcircuit as shown in FIG. 1E or 1F with similar elements bearing notation similar to that previously used. In FIG. 17A, there is shown a conventional CUK converter as known in the prior art. FIGS. 17B and 17C show a family of CUK quasi-resonant converters including one of the resonant switch subcircuits as shown in FIGS. 1E and 1F with similar elements bearing notations similar to that previously used. FIG. 18A shows a CUK converter including a transformer as known in the prior art. FIGS. 18B and 18C show a family of CUK quasi-resonant converters as including a transformer and one of the resonant switch subcircuits as shown in FIGS. 1E and 1F, with similar elements bearing notations similar to that previously used. FIG. 19A shows a SEPIC converter as known in the prior art. FIGS. 19B and 19C show a family of SEPIC quasi-resonant converters similar to that shown in FIG. 19A, but modified to include one of the resonant switch subcircuits as shown in FIGS. 1E or 1F with similar elements bearing the notations similar to that previously used.

Thus, there has been described above a family of quasi-resonant converters using a bidirectional resonant switch subcircuit, which switches on and off under zero current conditions. The resonant switch subcircuit is used to replace a conventional semiconductor switch in a wide variety of prior art PWM converters, thus forming the quasi-resonant converter of this invention. Such a converter offers many distinct advantages including: zero switching stresses, low switching losses, self commutation, quasi-sinusoidal current waveforms, and reduced EMI levels. The quasi-resonant converter of this invention operates at high efficiency and at high switching frequencies in excess of 1 MHz, whereby the size, weight and cost of its circuit elements can be reduced, and the dynamic performance and transit response improved. The bidirectional resonant switch of this invention can be applied to a large number of conventional converters, as only partially demonstrated above, whereby these converters are capable of operating at very high frequencies. The operation of such quasi-resonant converters in their full-wave mode renders them relatively insensitive to variations of loads.

In considering this invention, it should be remembered that the present disclosure is illustrative only, and the scope of the invention and should be determined by the appended claims.

We claim:
1. A quasi-resonant converter for providing regulated power comprising:
 (a) a voltage source;
 (b) a load;
 (c) a low pass filter formed from at least an inductor and a capacitor for filtering signal applied to said load;
 (d) bidirectional resonant switch means to be periodically actuated and deactuated, said switch means including a switch, a resonant capacitor, and a resonant inductor, said switch being actuated to a first state to permit a current flow in a first direction from said voltage source to said load and to block a current flow in a second, opposite direction, and being actuated to a second state to permit a current flow in said second direction from said load to said voltage source and to block the current flow in said first direction, for operating said quasi-resonant converter in a full-wave mode; and (e) said switch means being actuated to its first state to couple said resonant capacitor and said resonant inductor to form a resonant circuit, and to apply a charging current from said voltage source to said resonant capacitor, said resonant capacitor and said resonant inductor having respective selected impedances to establish a resonating current waveform on said resonant inductor, said resonating current waveform being applied to actuate and deactuate said switch means under zero current conditions.

2. The quasi-resonant converter as claimed in claim 1, wherein said charging current develops a resonating voltage waveform on said resonant capacitor, and there is included means coupled to said resonant capacitor and said load for rectifying and applying said resonating voltage waveform to said load.

3. The quasi-resonant converter as claimed in claim 1, wherein said switch means comprises a semiconductor switching device actuated to its first state to permit the current flow in said first direction, and a diode coupled in parallel with said semiconductor switching device to apply the current flow in said second direction.

4. The quasi-resonant converter as claimed in claim 3, wherein said semiconductor switching device comprises a bipolar transistor.

5. The quasi-resonant converter as claimed in claim 3, wherein said semiconductor switching device comprises a FET.

6. The quasi-resonant converter as claimed in claim 5, wherein said FET comprises a parasitic body diode, said diode comprising said parasitic body diode.

7. The quasi-resonant converter as claimed in claim 1, wherein said switch means operates periodically at a switching frequency $F_s$, said resonant capacitor and said resonant inductor having impedance values such that the resonant frequency of such resonant circuit is greater than $F_s$.

8. The quasi-resonant converter as claimed in claim 1, wherein said switch comprises a first semiconductor switching device coupled in series with a first diode for conducting in said first direction to form a first series circuit, and a second semiconductor switching device connected in series with a second diode disposed to conduct current in said second direction to form a second series circuit, said second series circuit being coupled in parallel with said first series circuit.

9. The quasi-resonant converter as claimed in claim 8, wherein said resonant inductor is coupled in series with each of said first and second series circuits and is connected to said resonant capacitor.

10. The quasi-resonant converter as claimed in claim 8, wherein said resonant capacitor is coupled in parallel across said resonant inductor and said first series circuit.

11. The quasi-resonant converter as claimed in claim 9, wherein there is included means for actuating said first semiconductor switch to its first state and said second semiconductor switch to its second state, and then said first semiconductor switch to its second state and second semiconductor switch to its first state whereby said charging current is permitted to establish multiple cycles of said resonanting voltages on said capacitor.

12. The quasi-resonant converter as claimed in claim 1, wherein there is included means for actuating said switch to its first state and then to its second state at a switching frequency in excess of 1 MHz.

* * * * *